United States Patent [19]

Edhlund

[11] 4,121,229

[45] Oct. 17, 1978

[54] FONT ELEMENT FOR PHOTOCOMPOSING MACHINE

[75] Inventor: Ronald D. Edhlund, Mount Prospect, Ill.

[73] Assignee: American Photo-Graphics Corporation, Elk Grove Village, Ill.

[21] Appl. No.: 779,468

[22] Filed: Mar. 21, 1977

[51] Int. Cl.$^2$ .................... G03B 17/06; G03B 17/10

[52] U.S. Cl. .................................... 354/15; 354/12

[58] Field of Search .............................. 354/13-16, 354/12; 101/415.1

[56] References Cited

U.S. PATENT DOCUMENTS

| | | | |
|---|---|---|---|
| 3,738,236 | 6/1973 | Grube et al. | 354/15 |
| 3,921,182 | 11/1975 | Hansen et al. | 354/15 |

*Primary Examiner*—John Gonzales

*Attorney, Agent, or Firm*—George H. Gerstman

[57] ABSTRACT

A font element for use in a photocomposing machine of the type having a rotatable drum which defines light-transmissive portions and carries hooks and buttons for coupling to the font element. The font element comprises a flexible sheet on which character images are arranged and defines apertures for receiving the hooks and buttons, with reinforcing members secured to the opposite edges of the font element. The reinforcing member secured to the trailing edge of the font element extends alongside the button-receiving apertures. This reinforcing member has an angled portion at one of the apertures with the angled portion being located to engage snugly the button received by the aperture.

8 Claims, 3 Drawing Figures

FIG. 1
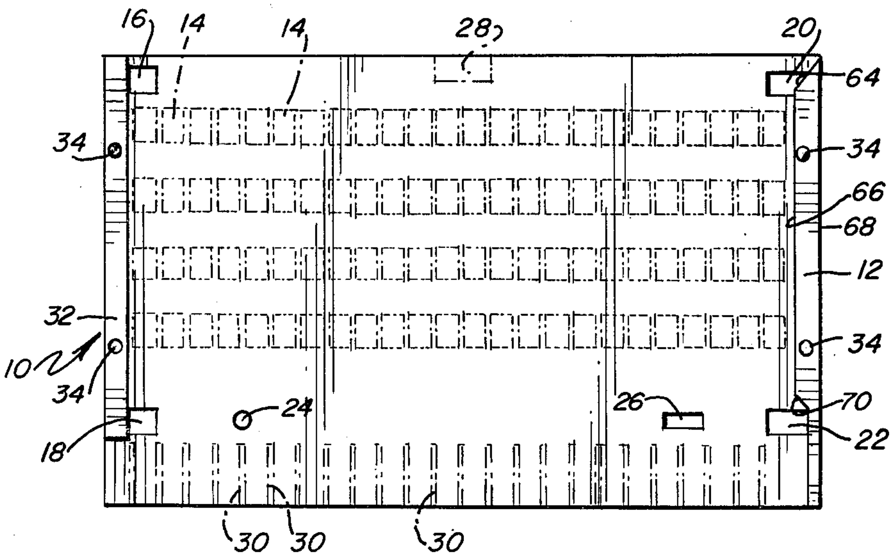
FIG. 2
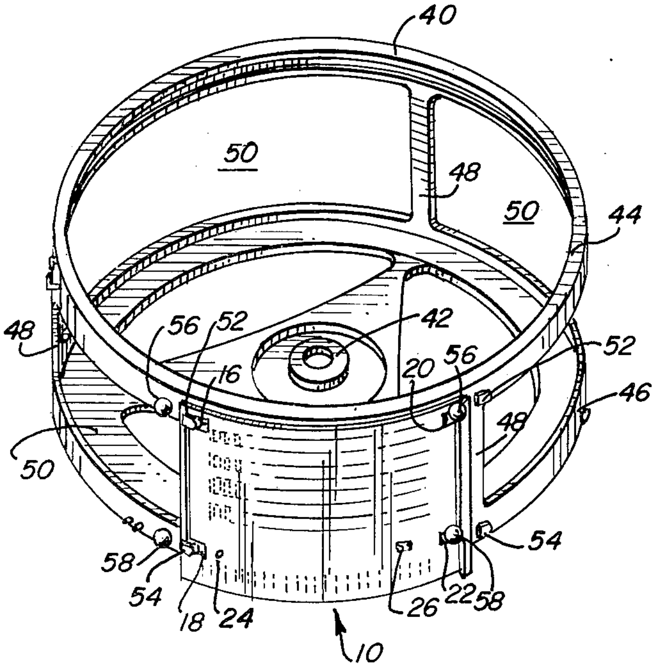
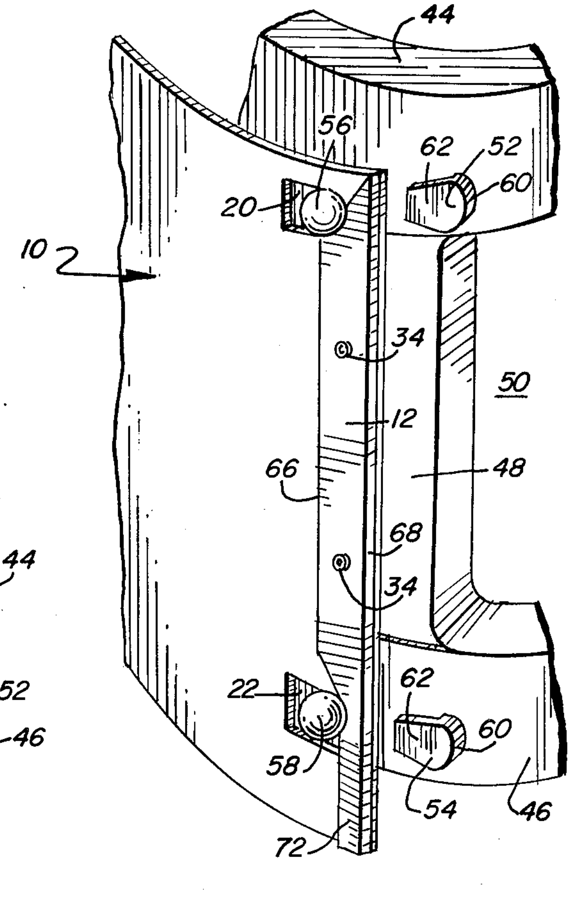
FIG. 3

FONT ELEMENT FOR PHOTOCOMPOSING MACHINE

BACKGROUND OF THE INVENTION

This invention relates to a font element for use in a photocomposing machine, such as the machine described in Grube, et al. U.S. Pat. No. 3,738,236, issued June 12, 1973.

In the Grube, et al. patent, a font element designated by the reference numeral 43 is described for coupling to a rotatable drum 10. The drum carries a plurality of hooks 33, 34 which are received by apertures 49 and 45, respectively, and "spherically-shaped members" 37 and 40 which are received by apertures 50 and 51, respectively, of the font element 43. Font element 43 of the Grube, et al. patent has a first reinforcing member 52 which underlies the hooks 33 and 34 and a second reinforcing member 55 which is connected to the other trailing edge of the font element between apertures 50 and 51.

In the Grube, et al. patent, a spring 60 extends from one end of second reinforcing member 55 and a spring 61 extends from the other end of second reinforcing member 55. Spring 60 traverses aperture 50 and spring 61 traverses aperture 51 so as to "snap over the widest portion of the spherically-shaped members", purportedly to hold the font element in place on the drum.

It has been found that the springs, such as disclosed in the Grube, et al. patent, have a tendency to bend or break under certain conditions, resulting in an insecure connection. On occasion, bending of one of the springs has caused the font element to release from the drum, which is fatal to the operation of the photocomposing machine. It has also been found that the springs, such as disclosed in the Grube, et al. patent, often are difficult to handle thereby rendering the font element, on occasion, difficult to attach to the drum and/or difficult to remove from the drum.

It is, therefore, an object of the present invention to provide a font element that is relatively simple to attach to the drum and is relatively simple to remove from the drum.

Another object of the present invention is to provide a font element having a reinforcing member that alleviates the bending problem concomitant with the projecting springs of the font element disclosed in the Grube, et al. patent.

A further object of the present invention is to provide a font element which is structured to positively and securely connect it to the drum.

A still further object of the present invention is to provide a font element which is simple in construction and is easy to manufacture.

A further object of the present invention is to provide a font element which is appealing or attractive to the operator, which is simple to operate with and which has means which retain the font element in proper position on the drum.

The bending problem associated with the projecting springs of the font element disclosed in Grube, et al. has been alleviated by the use of a prior art reinforcing member known as a Storch clip. The Storch clip is formed of brass and comprises a pair of members longitudinally and laterally slidable with respect to each other along the trailing edge of the font element adjacent the "spherically-shaped members". In order to attach the font element to the drum, one of the clip portions is slid upwardly and outwardly permitting the "spherically-shaped members" to enter the font element apertures. Once the "spherically-shaped members" have entered the apertures, the clip portion is slid downwardly and inwardly to engage snugly the "spherically-shaped members".

The basic disadvantages of the Storch clip is that it is relatively complex in structure, expensive to manufacture, requires substantial manipulation, and includes a pair of slidable members subject to wear and breakage. The present invention alleviates the disadvantages of the Storch clip, as well as alleviating the disadvantages concomitant with the projecting spring-type reinforcing member described in the Grube, et al. patent

SUMMARY OF THE INVENTION

In accordance with the present invention, a font element is provided for use in a photocomposing machine having a rotatable drum. The rotatable drum is of the type defining light-transmissive portions and having a pair of hooks for coupling to one edge of the font element and a pair of spherically-shaped members or buttons for coupling to the other edge of the font element. The font element is of the type comprising a flexible sheet on which character images are arranged and defining apertures for receiving the hooks and buttons. The font element is also of the type having a reinforcing member secured to one edge of the font element and adapted to underlie the hooks.

The improvement of the present invention comprises a second reinforcing member secured to the opposite edge of the font element. The second reinforcing member extends alongside the button-receiving apertures and has an angled portion at one of the apertures with the angled portion being located to engage snugly the button received by the one aperture. The other portion of the second reinforcing member is located to engage the button received by the other button-receiving aperture.

In the illustrative embodiment, the second reinforcing member extends substantially the entire length of the edge and is formed of a unitary, integral piece secured to the edge of the font element between the two apertures.

In the illustrative embodiment, the second reinforcing member is formed of rigid sheet-like material throughout its entire length and the angled portion is located adjacent the top of the font element with the angle extending along a major portion of the height of the adjacent aperture.

A more detailed explanation of the invention is provided in the following description and claims, and is illustrated in the accompanying drawings.

BRIEF DESCRIPTION OF THE DRAWINGS

FIG. 1 is an elevational view of a font element constructed in accordance with the principles of the present invention;

FIG. 2 is a perspective view of a rotatable drum for a photocomposing machine with the font element of FIG. 1 attached thereto; and FIG. 3 is a fragmentary, enlarged perspective view of a portion of the font element and drum of FIG. 2.

DETAILED DESCRIPTION OF THE ILLUSTRATIVE EMBODIMENT

Referring to the Figures, font element 10 is shown therein comprising a photographic negative in which the character images are transparent against an opaque background. Font element 10 is identical to font element 43 illustrated and described in Grube, et al. U.S. Pat. No. 3,738,236, except that the reinforcing member 12 of applicant's font element is significantly different from and a marked improvement upon reinforcing member 55 of the Grube, et al. font element which has springs 60 and 61 projecting therefrom.

Thus font element 10 includes a number of characters represented by rectangles 14 which define the area in which the characters can be located. The font element defines apertures 16 and 18 near its leading edge and apertures 20 and 22 near its trailing edge. Also defined by the font element are an alignment aperture 24 and a reference slot 26, a transparent portion 28 and transparent timing marks 30. Reinforcing member 12 is a second reinforcing member secured to the trailing edge of the font element 10 while the first reinforcing member 32 is secured to the leading edge of the font element. Both reinforcing members 12 and 32 are secured to the font element between the respective aperture pairs 20, 22 and 16, 18 by means of rivets 34 or other suitable fastening means.

Font element 10 is attached to rotatable drum 40, as illustrated in FIG. 2. Rotatable drum 40 may be constructed identically to the drum illustrated in FIG. 2 of the Grube, et al. patent, may be constructed in the manner illustrated in FIG. 2 herein or may take other related forms. Referring now to FIG. 2 herein, drum 40 comprises a hub portion 42 for connection to a suitable drive mechanism which may comprise a stepping motor. The periphery of the drum comprises a pair of parallel spaced rings 44, 46, with ring 44 being supported by spaced uprights 48. In the illustrative embodiment, there are three equi-spaced uprights 48 which, together with rings 44 and 46, define three large openings, or light-transmissive portions 50.

Font element 10 is connected to drum 40 so that the characters will be aligned with one of openings 50. The drum is constructed to enable connection of six font elements to the drum. The connection devices will now be described.

Referring to FIGS. 2 and 3, it can be seen that rings 44 and 46 carry pairs of vertically aligned hooks 52, 54 and pairs of vertically aligned, spherically-shaped members or buttons 56, 58. In the illustrative embodiment, a group containing one pair of hooks 52, 54 and one pair of buttons 56, 58 is located adjacent each upright 48 and centrally between uprights 48, thus permitting the drum to provide six of such groups equally spaced from each other. Each of the hooks 52, 54 includes a leg portion 60 extending radially from the ring and a foot portion 62 extending normally from leg portion 60 so as to permit the font element to underlie foot portion 62 when the font element is connected to the drum.

Font element 10, as mentioned above, includes a first reinforcing member 32 which is preferably formed of a metal such as brass, but may be formed of any other suitable material, such as plastic. Reinforcing member 32 is rectilinear in cross-sectional configuration and serves to reinforce apertures 16 and 18, as well as the leading end of font element 10.

Second reinforcing member 12 is also preferably formed of a metal, such as brass, but may be formed of any other suitable material, such as plastic, and has parallel upper and lower surfaces so as to permit it to be a stamping from metal sheet material. Reinforcing member 12 extends the entire length of the trailing edge of the font element and has an angled portion 64 at aperture 20 located adjacent the top of the font element, with the angled portion 64 extending along a major portion of the length of aperture 20. The reinforcing member 12 comprises sides 66, 68 which are spaced apart a relatively large amount along a major portion of the font element edge, to permit simple connection by means of rivets 34, but are spaced closer together at the lower portion of the reinforcing member to permit aperture 22 to be larger than aperture 20. An angled portion 70 is defined by the reinforcing member 12 above aperture 22.

The construction of reinforcing member 12 is such that font element 10 may be positively connected to the drum with an extremely simple operation and may be removed just as simply. To this end, to attach the font element to the drum, apertures 16 and 18 are placed over hooks 52, 54 and the font element is then moved rightward so as to permit reinforcing member 32 to underlie foot portion 62 of the hooks. Reinforcing member 12 is then urged rightward and toward the drum to permit buttons 56 and 58 to enter apertures 20 and 22, respectively. Reinforcing member 12 is dimensioned so that angled portion 64 will engage snugly with button 56 and side 66 of lower portion 72 will engage snugly with button 58.

Although no limitation is intended, as an example the width of reinforcing member 12 between sides 66 and 68 may be 3/32 inch at the thick portion and 3/64 inch at the narrow portion, with angled portion 64 being at an angle of 30° with respect to side 68. However, other dimensions are satisfactory and angled portion 64 may have an angle of between 20° and 60° with respect to side 68 in a preferred embodiment, and other angles may be found suitable.

To remove font element 10 from the drum, reinforcing member 12 is simply lifted outwardly so that the reinforcing member will be released from its snug connection with buttons 56 and 58 and the font element is then moved to the left and outwardly to allow apertures 16 and 18 to pass away from hooks 52, 54.

It can be seen that a font element has been provided which permits a very positive connection of the font element to the drum, with the reinforcing members being unlikely to bend and permitting the font element to be easily attached and removed from the drum. Although an illustrative embodiment of the invention is shown and described, it is to be understood that various modifications and substitutions may be made by those skilled in the art without departing from the novel spirit and scope of the present invention.

What is claimed is:

1. A font element for use in a photocomposing machine having a rotatable drum, the drum defining light-transmissive portions and having a pair of hooks for coupling to one edge of the font element and a pair of stationary buttons for coupling to the opposite edge of the font element, the font element comprising a flexible sheet on which character images are arranged, the font element defining apertures for receiving said hooks and apertures for receiving said buttons, and a reinforcing member secured to said one edge of the font element and adapted to underlie the hooks, the improvement comprising a second reinforcing member extending alongside the button-receiving apertures, said second reinforcing member having a main body portion and an angled portion adjacent the top of the font element and located to engage snugly the stationary button received by said one aperture, said angled portion extending from said main body portion and continosusly tapering toward a corner of the font element that is closest to the stationary button, the other portion of said second reinforcing member being located to engage the stationary button received by the other button-receiving aperture.

2. A font element as described in claim 1, said second reinforcing member extending substantially the entire length of said other edge.

3. A font element as described in claim 1, said second reinforcing member being formed of a unitary, integral piece and being secured to said opposite edge between said two apertures.

4. A font element as described in claim 1, said second reinforcing member being formed of rigid sheet-like material throughout its entire length.

5. A font element as described in claim 1, wherein said angled portion is located adjacent the top of said font element and the angle extends along a major portion of the height of the adjacent aperture.

6. A font element as described in claim 1, wherein the angle is between 20° and 60° with respect to said opposite edge.

7. A font element for use in a photocomposing machine having a rotatable drum, the drum defining light-transimissive portions and having a pair of hooks for coupling to one edge of the font element and a pair of stationary buttons for coupling to the opposite edge of the font element, the font element comprising a flexible sheet on which character images are arranged, the font element defining apertures for receiving said hooks and apertures for receiving said stationary buttons, and a reinforcing member secured to said one edge of the font element and adapted to underlie the hooks, the improvement comprising a second reinforcing member formed of a unitary, integral piece of sheet-like material throughout its entire length and secured to said opposite edge between said two apertures, said second reinforcing member extending substantially the length of said other edge and alongside the button-receiving apertures, said second reinforcing member having a main body portion and an angled portion adjacent the top of the font element and located to engage snugly the stationary button received by said one aperture, said angled portion extending from said main body portion and continuously tapering toward a corner of the font element that is closest to the stationary button, the other portion of said second reinforcing member being located to engage the button received by the other button-receiving aperture.

8. A font element as described in claim 7, wherein said angled portion is located adjacent the top of said font element and the angle extends along a major portion of the height of the adjacent aperture, said angle being between 20° and 60° with respect opposite edge.

* * * * *